(12) United States Patent
Mallikarjuna

(10) Patent No.: US 10,158,271 B2
(45) Date of Patent: Dec. 18, 2018

(54) SYSTEM FOR GENERATING HYDROKINETIC POWER FROM A SUBCRITICAL CHANNEL

(71) Applicant: Challa Balaiah Mallikarjuna, Bangalore (IN)

(72) Inventor: Challa Balaiah Mallikarjuna, Bangalore (IN)

( * ) Notice: Subject to any disclaimer, the term of this patent is extended or adjusted under 35 U.S.C. 154(b) by 0 days.

(21) Appl. No.: 15/502,619

(22) PCT Filed: Aug. 4, 2015

(86) PCT No.: PCT/IN2015/000311
§ 371 (c)(1),
(2) Date: Feb. 8, 2017

(87) PCT Pub. No.: WO2016/020933
PCT Pub. Date: Feb. 11, 2016

(65) Prior Publication Data
US 2017/0229940 A1    Aug. 10, 2017

(30) Foreign Application Priority Data
Aug. 8, 2014    (IN) .......................... 3918/CHE/2014

(51) Int. Cl.
*E02B 9/00* (2006.01)
*F03B 13/14* (2006.01)
(Continued)

(52) U.S. Cl.
CPC ......... *H02K 7/1823* (2013.01); *F03B 13/086* (2013.01); *F05B 2240/13* (2013.01)

(58) Field of Classification Search
CPC .... E02B 9/00; E02B 9/08; F03B 13/14; F03B 13/26; F03B 13/144; F03B 13/268;
(Continued)

(56) References Cited

U.S. PATENT DOCUMENTS 1,493,154 A * 5/1924 Harza ..................... F03B 11/02
                                                                290/52
2,025,722 A   12/1935 Camp et al.
(Continued)

FOREIGN PATENT DOCUMENTS

WO    2011121603 A1    10/2011
WO    2012177182 A9    2/2013

OTHER PUBLICATIONS

International Search Report and Written Opinion corresponding to PCT/IN2015/000311, dated Dec. 22, 2015.

*Primary Examiner* — Benjamin F Fiorello
*Assistant Examiner* — Edwin J Toledo-Duran
(74) *Attorney, Agent, or Firm* — LeClairRyan PLLC

(57) ABSTRACT

A system for generating hydrokinetic power from a subcritical channel is disclosed. The system comprises a power channel diverted from the subcritical channel for generating hydrokinetic power by changing one more flow parameters of water, wherein the power channel includes an intake section, one or more slope section, one or more power section and a recovery section, an intake spillway at the intake section of power channel, connecting the subcritical channel with the power channel for enhancing the velocity of water, wherein the intake spillway is designed based on rate of discharge of water to be drawn from the subcritical channel and an array of turbines located in the power channel for generating power using the diverted water from the subcritical channel, wherein the number of turbines are based on the length of the power channel.

16 Claims, 8 Drawing Sheets

(51) Int. Cl.
*F03B 13/26* (2006.01)
*H02K 7/18* (2006.01)
*F03B 13/08* (2006.01)

(58) Field of Classification Search
CPC .......... F03B 13/12; F03B 13/18; F03B 13/20; F03B 13/22; F03B 13/24; F03B 15/00; F03B 15/005; F03B 15/02; F03B 15/04; F03B 15/06; F03B 15/08; F03B 15/10; F03B 15/12; F03B 15/14; F03B 15/16; F03B 15/18; F03B 15/20; F03B 15/22; F03B 13/10; F03B 17/061; A63B 69/0093; A63B 69/125; Y02E 10/28; Y02E 10/38
USPC ....... 405/75, 76, 77, 78, 79; 290/42, 43, 54; 416/197 A
See application file for complete search history.

(56) References Cited

U.S. PATENT DOCUMENTS

| | | | | |
|---|---|---|---|---|
| 3,222,870 A * | 12/1965 | Miller | ............... | E02B 3/062 405/27 |
| 4,441,029 A * | 4/1984 | Kao | ............... | F03B 13/08 290/52 |
| 5,236,280 A * | 8/1993 | Lochtefeld | ............... | A63B 69/0093 405/52 |
| 5,377,485 A * | 1/1995 | Bellamy | ............... | F03B 13/00 290/42 |
| 5,401,117 A * | 3/1995 | Lochtefeld | ............... | A63B 69/0093 4/491 |
| 5,628,584 A * | 5/1997 | Lochtefeld | ............... | A63B 69/0093 405/52 |
| 5,667,445 A * | 9/1997 | Lochtefeld | ............... | A63B 69/0093 472/117 |
| 6,491,589 B1 * | 12/2002 | Lochtefeld | ............... | A63C 19/00 239/288 |
| 6,546,723 B1 * | 4/2003 | Watten | ............... | F03B 13/00 60/398 |
| 6,824,347 B2 * | 11/2004 | Maloney | ............... | E03B 7/075 415/1 |
| 6,943,461 B2 * | 9/2005 | Kaploun | ............... | H02K 7/183 290/43 |
| 7,456,514 B2 * | 11/2008 | Ahmad | ............... | F03B 17/063 290/54 |
| 2002/0044835 A1 * | 4/2002 | Esposito | ............... | E03B 3/04 405/80 |
| 2007/0063520 A1 * | 3/2007 | Ahmad | ............... | F03B 17/063 290/54 |
| 2008/0101866 A1 * | 5/2008 | McLaughlin | ............... | A63B 71/02 405/79 |
| 2008/0206077 A1 * | 8/2008 | Royset | ............... | E02B 9/08 417/333 |
| 2009/0175723 A1 * | 7/2009 | Broome | ............... | F03B 1/00 416/31 |
| 2009/0226296 A1 * | 9/2009 | Bibeau | ............... | F03B 13/264 415/1 |
| 2014/0110944 A1 * | 4/2014 | Gharib | ............... | F03B 17/06 290/54 |

* cited by examiner

SYSTEM FOR GENERATING HYDROKINETIC POWER FROM A SUBCRITICAL CHANNEL

This application is a national stage application under 35 U.S.C. § 371 of PCT Application No. PCT/IN2015/000311, filed Aug. 4, 2015, which claims priority of India Application No. 3918/CHE/2014, filed Aug. 8, 2014, which are hereby incorporated by reference in their entirety.

FIELD OF INVENTION

The present invention relates to the field of power generation. More particularly, the invention relates to a hydrokinetic power generation from subcritical channels by enhancing the currents of flow through power channel of suitably designed to extract power.

BACKGROUND OF THE INVENTION

The power consumption increases exponentially day by day which invites an urgent requirement of cost-effective techniques for generating electricity from various water resources. The flowing water in manmade canals, tailraces, diversion channels, or other fluid flow channels is considered as a reliable resource for generating electricity up to few megawatts. Even though there is a lot of subcritical manmade canals that are useful for generating hydrokinetic power, this potential for power generation remains untapped, since challenges and limitation to enhance velocity in a subcritical manmade channel. One of the key reasons is that the manmade channels are mild slope channels.

The subcritical channel water conveyance system includes closed channel water conveyance system and open channel water conveyance system. In open channel water conveyance systems, gravity is the driving force that moves the water, while frictional forces along the wetted perimeter of the channel oppose the motion. A slight downward slope is sufficient to overcome the opposing frictional forces. The bottom or sides of a flow channel is either unlined or lined with suitable materials. If the flow channel is lined, the flow retarding frictional forces are reduced. The overall flow velocity in open channels is usually designed to be relatively small to prevent turbulent flow conditions in the channel or to prevent scouring along the wetted perimeter of the channel. The ambient flow velocities in open fluid flow channels are generally less than 1.5 m per second.

In conventional methods of the generation of hydrokinetic power, the power generation systems are within the existing channel system. In conditions, it is ensured that the sufficient flow velocities are available naturally in the system. Otherwise, the velocity of the water flow is enhanced by inserting flumes in the existing channel without diverting water. There are many challenges in subcritical channels to enhance the velocity. The flow in subcritical channel is accelerated to a higher velocity than available with the expanses of depth of channel so that the swept area for power generation is reduced and it suits only for vertical axis turbines. The theoretical limit for power coefficient for these turbines is 0.59. This limit is known as Betz limit. However, the power coefficient of these turbines in practical conditions ranges from 0.30 to 0.35. In such channels the velocity of water can be raised only up to a critical depth of the channel. Beyond that the upstream of the channel get affected. Generally in the subcritical channel, the acceleration is done by flumes so that the velocity at the throat is more and suits for power extraction. However, the length of the throat is very small in normal condition and can accommodate one or two turbines for power generation. This limits the maintenance of higher depth and velocity for longer length for high power generation.

Subcritical channels are mild slope channel generally have higher depth and lesser velocity. Therefore, it is not possible to have higher velocity for the flow at higher depth. In order to have higher velocity, the depth of channel is to be reduced. This kind of channels generally not suitable for horizontal axis ducted turbines which is required both higher depth and higher velocity.

Hence, there is a need of a method of generating hydrokinetic power from subcritical channel where natural velocities not available for generating power to cater the rising demand for power. Additionally, there is also a need for cost effective extraction of hydrokinetic power from channels, especially in manmade conveyance systems. Since the primary function of these water conveyance systems is for drinking or irrigation purposes, it is imperative that the installation and operation of hydrokinetic power generation facility in these subcritical channels do not have an adverse impact on their capability to deliver water in a desired flow and at an expected quality.

SUMMARY

An objective of present invention is to design a system for generating hydrokinetic power from a subcritical channel.

As per one aspect of present invention, the system for generating hydrokinetic power from a subcritical channel comprises a power channel diverted from the subcritical channel for generating hydrokinetic power by changing one more flow parameters of water, wherein the power channel includes an intake section, one or more slope section, one or more power section and a recovery section, an intake spillway at the intake section of power channel, connecting the subcritical channel with the power channel for enhancing the velocity of water, wherein the intake spillway is designed based on rate of discharge of water to be drawn from the subcritical channel and an array of turbines located in the power channel for generating power using the diverted water from the subcritical channel, wherein the number of turbines are based on the length of the power channel. In the present invention, the effect due to change in flow parameters of water at the power channel is isolated from the subcritical channel by maintaining a free flow operation of the intake spillway and a pre-defined energy at the slope section and the recovery section of the power channel. The system further comprises a first diversion weir installed across subcritical channel beyond opening of the power channel for diverting the flow of water to the power channel, where the first diversion weir is closed for diverting the water to generate power in the power channel and a second diversion weir located at the opening of power channel for closing the power channel during no power generation in the power channel. Moreover, the turbines in the array of turbines are located at a pre-defined distance from each other in the power channel based on the velocity recovery length and turbulence of water in the power channel.

BRIEF DESCRIPTION OF THE ACCOMPANYING DRAWINGS

The aforementioned aspects and other features of the present invention will be explained in the following description, taken in conjunction with the accompanying drawings, wherein.

DETAILED DESCRIPTION OF THE INVENTION

Figure 1A:
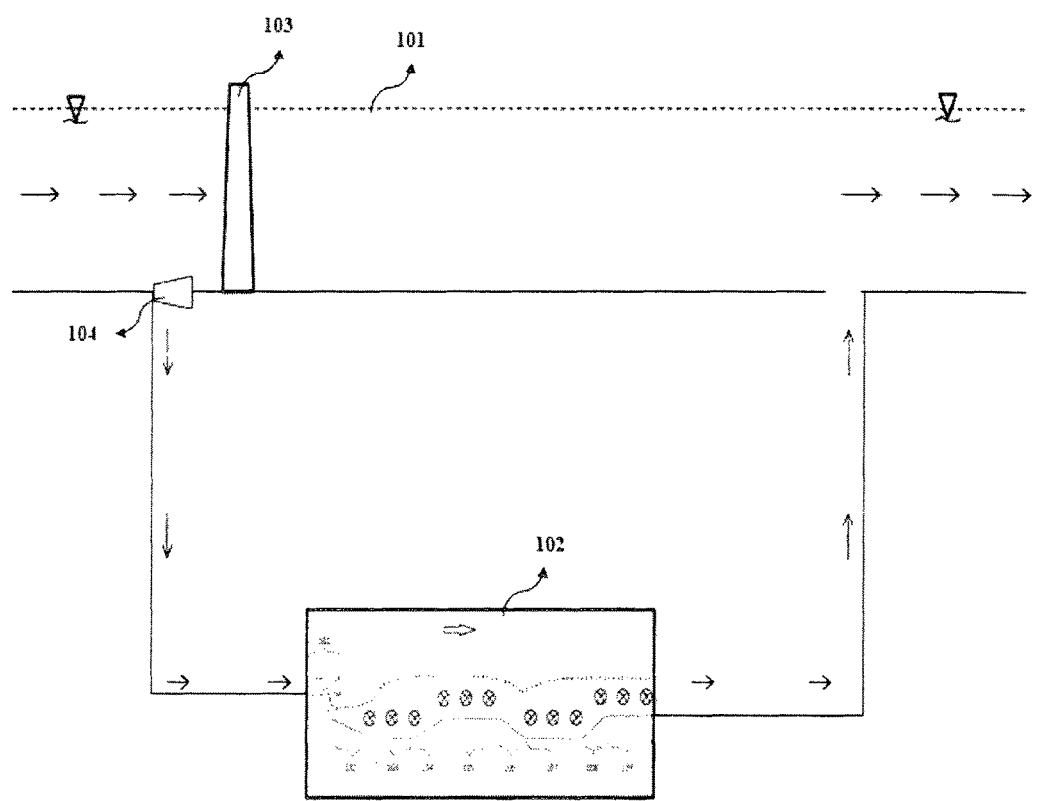
FIGS. 1A and 1B illustrate a cross section and elevation view of a power generation system, according to an embodiment of the present invention.

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention discloses a system for generating power from subcritical channels used for irrigation purposes. According to one embodiment of present invention, water is diverted from the subcritical channel to a power channel. The power channel is designed with slopes and elevations to increase the velocity of water for generating power.

Figure 1B:
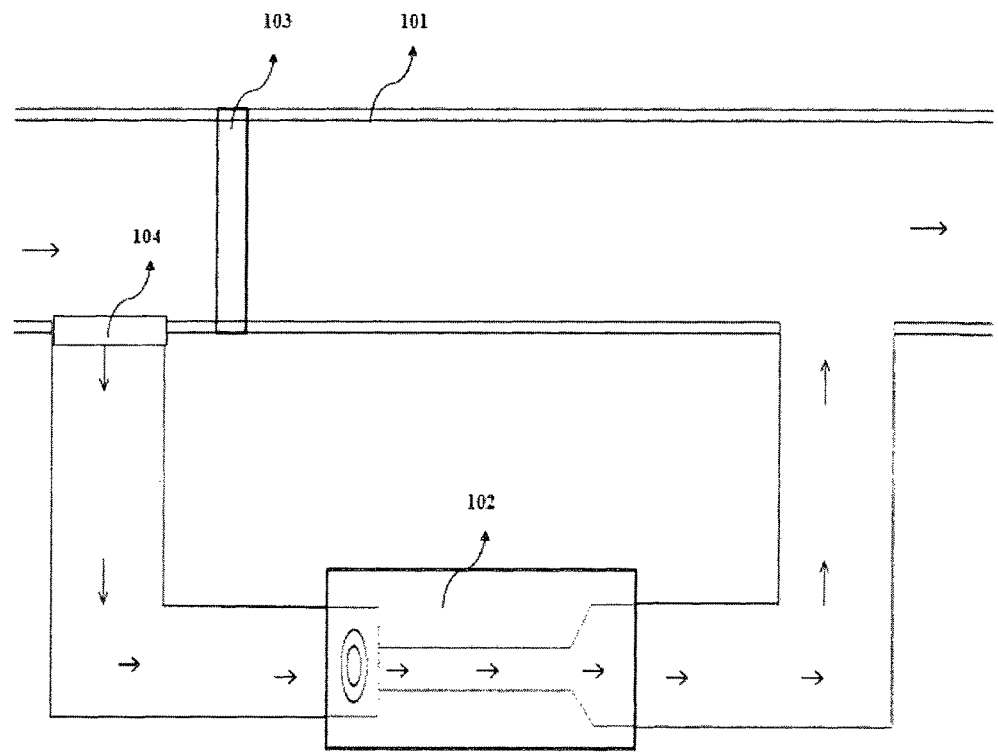

The aforementioned aspects and other features of the present invention will be explained in the following description, taken in conjunction with the accompanying drawings, wherein:

FIGS. 1A and 1B illustrate a cross section and elevation view of a power generation system according to an embodiment of the present invention. The system for generating hydrokinetic power from a subcritical channel comprises a power channel 102 connected to the subcritical channel 101. The water from the subcritical channel is diverted to the power channel by installing diversion weir. In one embodiment of present invention, a first diversion weir 103 installed across subcritical channel beyond the opening of the power channel for diverting the flow of water to the power channel. Moreover, the first diversion weir 103 blocks the flow of water through the subcritical channel. In another embodiment, the first diversion weir 103 allows flow of water through the subcritical channel, when no power is generated at the power channel. A second diversion weir 104 located at the opening of power channel for closing the power channel if no power is generated at the power channel 102. The power channel is designed in such a way that the change in hydraulic parameters to enhance velocity does not affect flow parameters of the subcritical channel 101. The water expels from the power channel fills the entire subcritical channel by a back flow. Thus, the level of water in the subcritical channel 101 is maintained constant.

Figure 2:
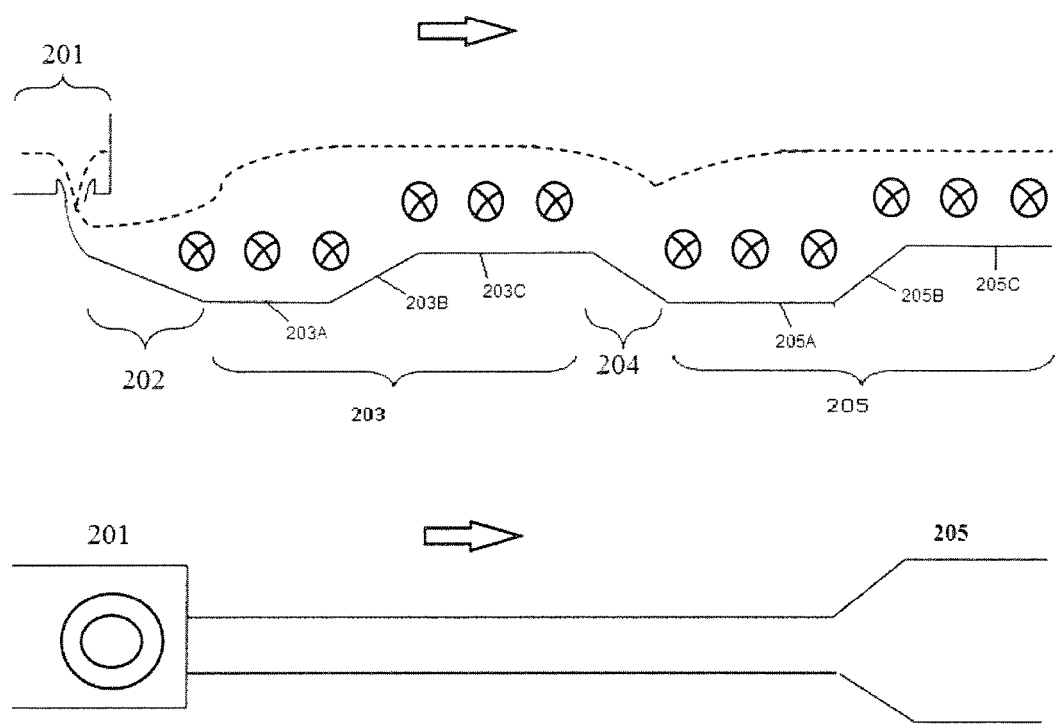
FIG. 2 illustrates a cross section and elevation view of a power channel system, according to an embodiment of the present invention.

FIG. 2 illustrates a cross section and elevation view of a power channel system according to an embodiment of the present invention. In an exemplary embodiment of present invention, the power channel comprises an Intake section, which comprises an inlet spillway 201, a first slope section 202, first power section 203, second slope section 204, second power and recovering section 205. The various sections are formed by modifying the channel parameters of existing subcritical channel at power channel. The modification comprises of dividing the power channel in to five sections and labeled as 201 to 205, further the section 203 and 205 are divided into three subsections and labeled as 203A to 203C and 205A to 205C respectively. The different sections such as the first slope section 202, the first power section 203, the second slope section 204 and the second power and recovering section 205 repeats based on the length of the power channel in order to increase the power generation. The various sections of the power channel are designed to change the flow parameters of the water flowing in the power channel in order to enhance the power generation.

The intake section 201 comprises intake spillway. The intake spillway enables the water inflow to the power channel. The intake spill way is designed in such a way that the depth of the subcritical channel does not change. Different types of spillways are available in practice and the construction and operation of one of the spillway called drop inlet spillway are explained in detail in FIG. 6 to FIG. 10 of the disclosure.

The first slope section 202 constitutes a slope with a predefined cross section having a predetermined bottom elevation. In an exemplary embodiment of present invention the slope section 202 constitutes a supercritical slope and having bottom elevation lower than the subcritical channel by a predetermined height. The system according to one embodiment of present invention includes the first power section 203. The first power section 203 comprises at least one of a horizontal bed subsection 203A, an adverse slope subsection 203B and a slope subsection 203C. The horizontal bed subsection 203A possesses a pre-defined cross sectional area. The pre-defined cross sectional area is defined based on the rate of generation of power from the power channel. In one exemplary embodiment of present invention, the cross sectional area of horizontal bed 203B is same as that of the cross sectional area of first slope section 202. The adverse slope subsection having a gradually increasing bottom elevation up to a predetermined height. The height of the adverse slope is determined based on depth of water flows in the power channel. Likewise, in an exemplary embodiment of present invention, the cross sectional area of one or more sections in the power channel corresponding to the water discharge form the intake spillway and velocity requirement at each of the sections. The cross sectional area of adverse slope subsection 203B is equal to the cross sectional area of the first slope section 202. The slope subsection 203C is the last portion of the power section 203. The slope subsection may have supercritical slope, subcritical slope and critical slope with a predetermined length.

The first power section 203 is followed by the second slope section 204. The second slope section 204 has predefined slope, in an exemplary embodiment of present invention the slope section 204 having supercritical slope of same cross section of 203. The second slope section 204 lowers the elevation of the power channel to a predetermined depth. The second slope section is followed by second power section 205. According to one embodiment of present invention, the second power section 205 includes similar subsections as that of first power section 203. However, at adverse slope subsection of second power section 205 has a channel transition horizontally so that slope subsection of the second power section is wider compared to slop subsection of first power section 203. Each subsection of the power sections has a predetermined length. The length of each of the subsection is determined based on the length of power channels and subcritical channel from which the power channel is diverted.

In an exemplary embodiment of present invention, the second power section 205 includes a recovery section that connects the power channel with the subcritical channel. The bed of recovery section is designed to match the bottom elevation of the subcritical channel. The effect due to change in flow parameters of water at the power channel is isolated from the subcritical channel by maintaining a free flow operation of the intake spillway and a pre-defined energy at the slope section and the recovery section of the power channel.

According to one exemplary embodiment of present invention, the water enters to the intake section 201 of power channel from existing subcritical channel 101. The intake section 201 comprises an intake spillway of predetermined approach depth. Water from the subcritical channels pools up to the height of the approach depth of the intake spillway. Beyond the approach depth, water flows in to the intake spillway and flows to the first slope section 202. At this stage, the subcritical velocity of water increases to velocity of supercritical state of higher energy and the total energy of the water flow increase based on the supercritical velocity.

The various sections of the power channel bring back the water level of existing channel at first slope section by isolating power channel 102 from subcritical channel 101.

As water flows from the first slope section 202 and through the first power section 203, the horizontal bed subsection 203A convey the super critical flow from the first slope section to the adverse slope subsection 203B of predetermined length and height. The slope at the adverse slope subsection slowdown the velocity of supercritical state by increasing depth. Further, supercritical velocity gradually turns to subcritical velocity and increases the depth at horizontal bed subsection 203A. The slope subsection 203C finally confirms at a predetermined depth, which is equal to level of depth of the existing subcritical channel with higher velocity than ambient flow velocity of existing subcritical channel.

The depth which is confirmed at the slope subsection 203C increases the pressure energy at horizontal bed and consecutively balances within the slope section 202. Thus the water flow becomes steady flow at slope subsection 203C with subcritical velocity before entering to second slope section 204. The velocity and depth of first power section 203 of power channel is suitable for power generation.

The velocity at the second slope section 204 increases up to supercritical state similarly as first slope section. This isolates the first power section 203 from second power section 205. Thus the power channel envisages disturb free power generation at first power section of power channel. The flow profile and principle of operation of second power section 205 is similar to first power section 203.

According to one embodiment of present invention, the second power section is considered as a recovery section which exits from the power channel 102 by entering to subcritical channel 101 and the flow become study state. At study state the depth and velocity of the second power section is also suitable for power generation. The arrays of hydrokinetic turbines are installed to extract kinetic power throughout the stretch of power channel including first slope section 202, first power section 203, second slope section 204 and second power section 205. The turbines in the array of turbines are located at a pre-defined distance from each other in the power channel based on the velocity recovery length and turbulence of water in the power channel.

The various modifications brought about in the power channels regarding the length and width of channel sections, bed slope, length and height of spillways varies from channel to channel based on the amount of water present and are governed by the equations described in the specification which will enable a person skilled in the art to better understand the construction and working of the system. The power channel has at least one of a trapezoidal, rectangular, circular, elongated circular and U shaped channel with a pre-defined cross sectional area.

The system of the present invention is used primarily in subcritical channel such as irrigation channels. The system is used for generating power by enhancing the subcritical velocities to desired level in the power channel and capture power through array of hydrokinetic turbines. Additionally, since the water after the power generation is redirected into the subcritical channel, the primary purpose of the original channel is not hampered.

The flow of water in open channels with small slopes along the length of the channel is illustrated in view of present invention as follows:

The uniform or gradually varied flows and the related negligible energy losses, the flow hydraulics are governed by the Bernoulli equation which express conservation of energy along the length of the channel.

Consider the upstream and downstream flow according to Bernoulli equation as flow in the subcritical channel for irrigation and power channel derived from the subcritical channel for generation of power.

Let, Y1 be depth of flow in the subcritical channel and Y2 be the depth of flow in the power channel, V1 is flow velocity in the subcritical channel and V2 be the flow velocity in the power channel, g is acceleration due to gravity.

The flow hydraulics governed by the Bernoulli equation which express conservation of energy along the length of the subcritical channel and the power channel is as follows:

$$Y1+V1^2/2g=Y2+V2^2/2g \quad (1)$$

Likewise, the specific energy E of an open channel flow, relative to the bottom of the channel, is the sum of the two terms on either side of the Bernoulli equation 1 above:

$$E=Y+V2/2g \quad (2)$$

A plot of equation 2 is generally called the specific energy curve, with the flow depth Y along the vertical axis and specific energy, E, along the horizontal axis (not shown).

For a set of pre-defined values of specific energy, there are two possible flow depths in a channel. At higher depth the flow velocity is smaller, known as subcritical value. At the deeper or lower depth, the flow velocity is higher, known as super-critical value. The transition from sub-critical to super-critical velocity happens at the smallest value of specific energy. In open channels that are primarily used for water conveyance purpose, the velocities are generally in the sub-critical range. As the channel cross section narrows, the flow depth decreases and the flow velocity increases. At a critical depth, the flow velocity changes from sub-critical to super-critical.

According to one embodiment of present invention, the cross sectional area, depth and the elevation of the channel are varied to change the velocity of the flow based on the requirement of power generation.

Figure 3:
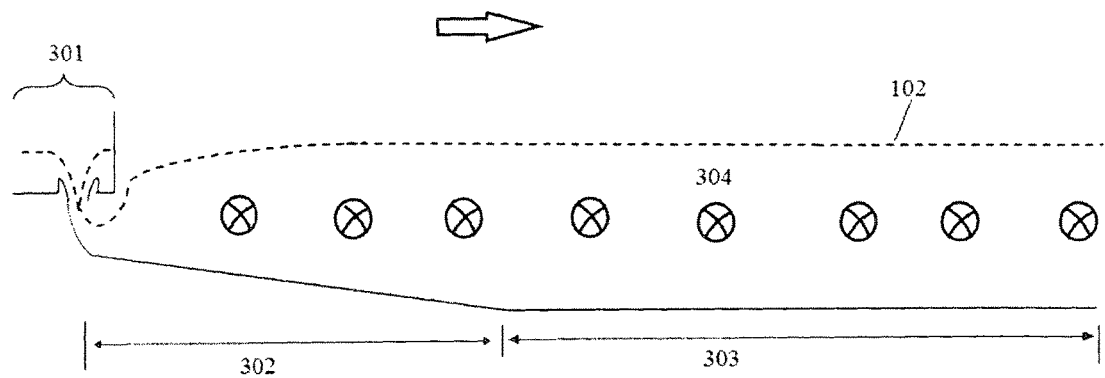
FIG. 3 is a schematic representation of power channel of system for generating hydrokinetic power from a subcritical channel, according to an embodiment of the present invention.

FIG. 3 is a schematic representation of power channel of system for generating hydrokinetic power from a subcritical channel according to an embodiment of the present invention.

The water is diverted from any of the subcritical channel used for irrigation or any other types of water conveyance facility to a power channel for generating hydrokinetic power. According to present embodiment of invention, the power channel comprises intake section 301, a slope section 302 and a horizontal bed section 303.

The intake section 301 enables the inflow of water to the power channel 102 from the subcritical channel 101. The intake spillway enables the water inflow to the power channel. The intake spill way is designed to enhance the velocity of water inflow to the power channel. Different types of spillways and the construction of the same are explained in detail in FIG. 10 of the disclosure.

The slope section 302 of the power channel is either a steeper mild slope, supercritical or critical slope area which includes an array of turbine. The velocity of flow increases based on the slope of the slope area 302. The power is generated using the turbines. The amount of power generation is enhanced due to the increase in velocity. The turbines in the array of turbines are located at a pre-defined distance from each other in the power channel based on the velocity recovery length and turbulence of water in the power channel.

The horizontal bed section 303 assists in regaining depth of water at the subcritical channel 101 from the power channel. The power channel aims to enhance the velocity for the flow of water higher than the subcritical channel in order to enhance the power generation. Arrays of turbines 304 are located in the horizontal bed section for generating power. The turbines in the array of turbines are located at a pre-defined distance from each other in the power channel based on the velocity recovery length and turbulence of water in the power channel.

The amount of power generated in the power channel can be varied by varying the slop and cross sectional area of each section of the power channel. Likewise, the power generation also depends in the swept area and velocity of water. By altering the slop and cross sectional area one can vary the velocity based on the length of the power channel. The different sections of the power channel can be repeated based on the length and requirement of power.

Figure 4:
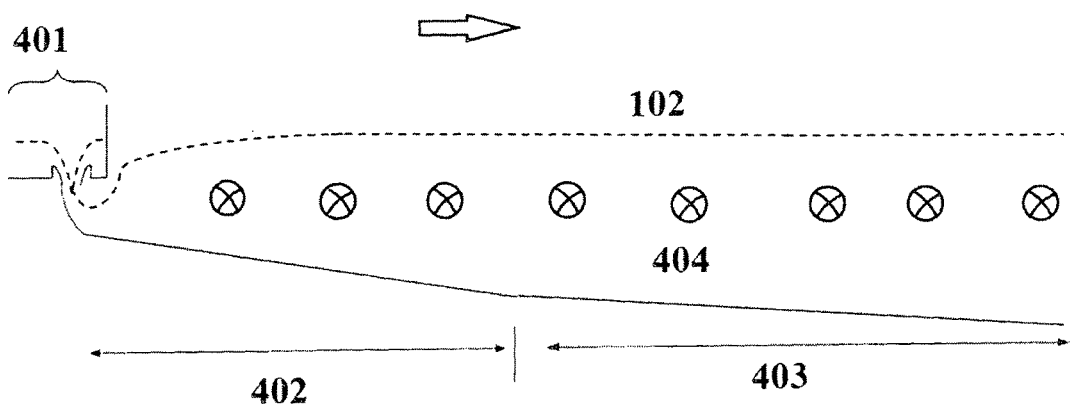
FIG. 4 is a schematic representation of power channel of system for generating hydrokinetic power from a subcritical channel, according to an embodiment of the present invention.

FIG. 4 is a schematic representation of power channel of system for generating hydrokinetic power from a subcritical channel according to an embodiment of the present invention. The power channel comprises an intake section 401, a slope section 402 and mild slope section 403. The construction of power channel in present embodiment is similar to the power channel as described in FIG. 3. However, unlike the horizontal bed section 303 of FIG. 3, the present embodiment includes a mild slope section 403. An array of turbines 405 is located in throughout the power channel for the generating power.

Figure 5:
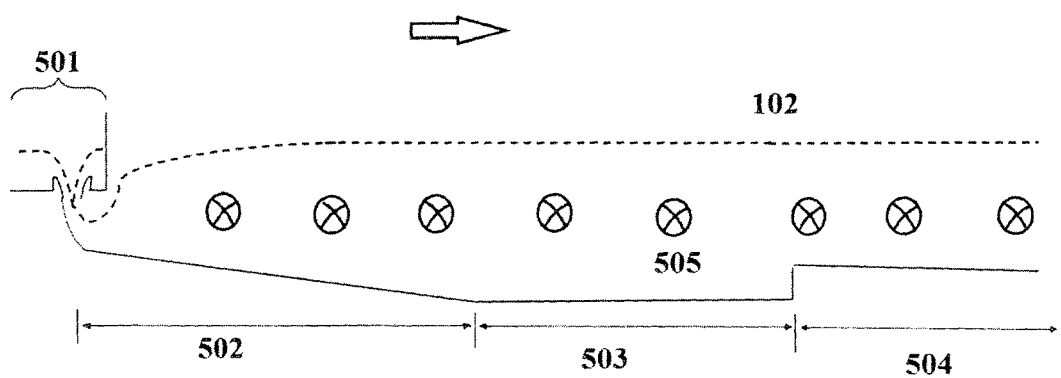
FIG. 5 is a schematic representation of power channel of system for generating hydrokinetic power from a subcritical channel, according to an embodiment of the present invention.

FIG. 5 is a schematic representation of power channel of system for generating hydrokinetic power from a subcritical channel according to an embodiment of the present invention. The power section according for generating power by diverting water from a subcritical channel comprises an intake section 501, a slope section 502, a horizontal bed section 503 and an elevated section 504. An array of turbines 505 is located in throughout the power channel for the generating power.

The intake section 501 enables the inflow of water to the power channel 102 from the subcritical channel 101. The intake spillway enables the water inflow to the power channel. The intake spill way is designed to enhance the velocity of water inflow to the power channel. Different types of spillways and the construction of the same are explained in detail in FIG. 10 of the disclosure.

The slope section 502 of the power channel is a slope area which includes an array of turbine. The velocity of flow increases based on the slope of the slope area 502. The power is generated using the turbines. The amount of power generation is enhanced due to the increase in velocity. The turbines in the array of turbines are located at a pre-defined distance from each other in the power channel based on the velocity recovery length and turbulence of water in the power channel.

The horizontal bed section 503 assists in regaining depth of water at the subcritical channel 101 from the power channel. The power channel according to present embodiment comprises an elevated section, which elevate the depth of the power channel. This increases the bottom elevation of the power channel, which in turn increases the velocity of flow at the elevated section 504.

The power channel aims to enhance the velocity for the flow of water higher than the subcritical channel in order to enhance the power generation. An array of turbines 505 is located in the power channel for generating power. The turbines in the array of turbines are located at a pre-defined distance from each other in the power channel based on the velocity recovery length and turbulence of water in the power channel.

The amount of power generated in the power channel can be varied by varying the slop and cross section of each section of the power channel. Likewise, the power generation also depends in the swept area and velocity of water. By altering the slop and cross sectional area one can vary the velocity based on the length of the power channel.

Drop Inlet (Shaft or Moring Glory) Spillways.

Figure 6:
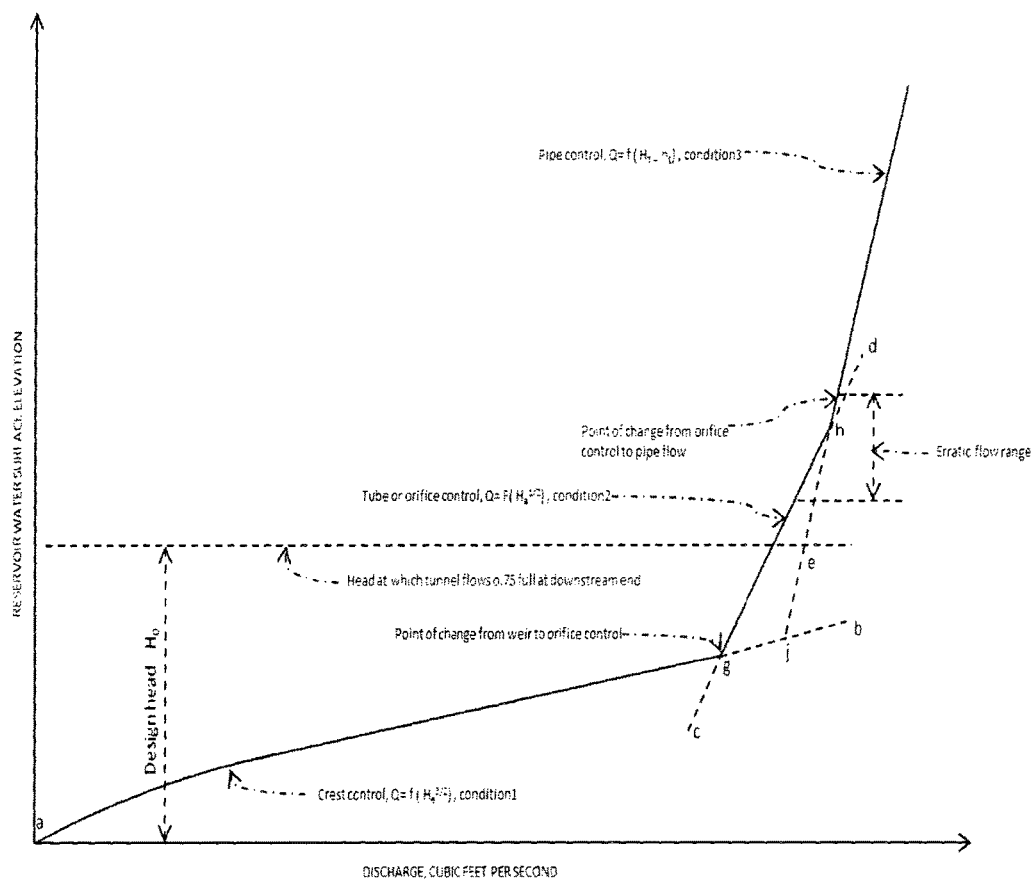
FIG. 6 is a graphical representation illustrating the discharge curve of the drop inlet or Morning glory spillway
Figure 7:
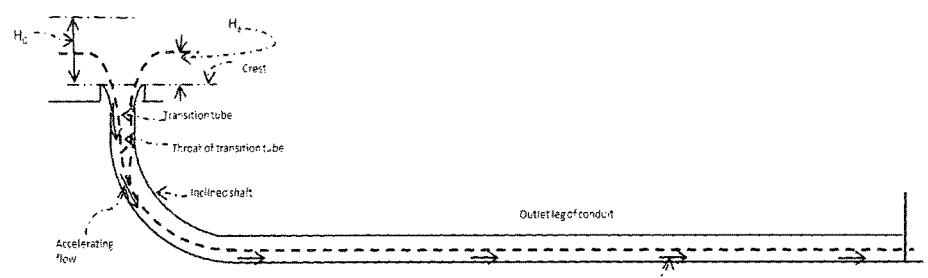
FIG. 7 is the crest control of the drop inlet spillway.
Figure 8:
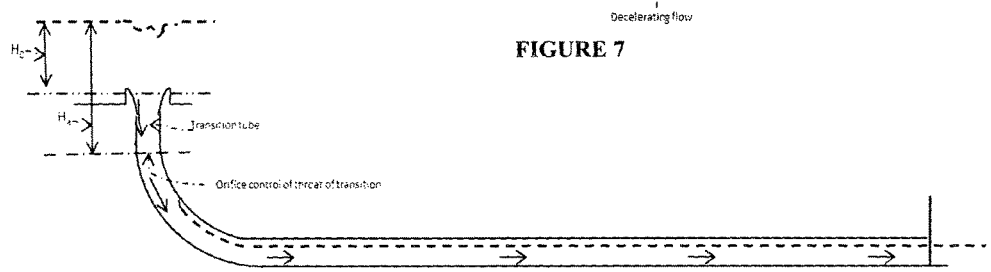
FIG. 8 is the orifice or tube control of the drop inlet spillway.
Figure 9:
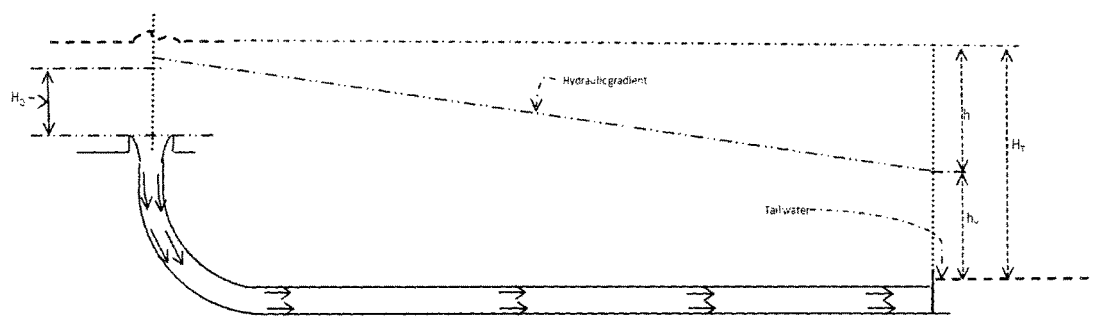
FIG. 9 is the conduit flow of the drop inlet spillway.
Figure 10:
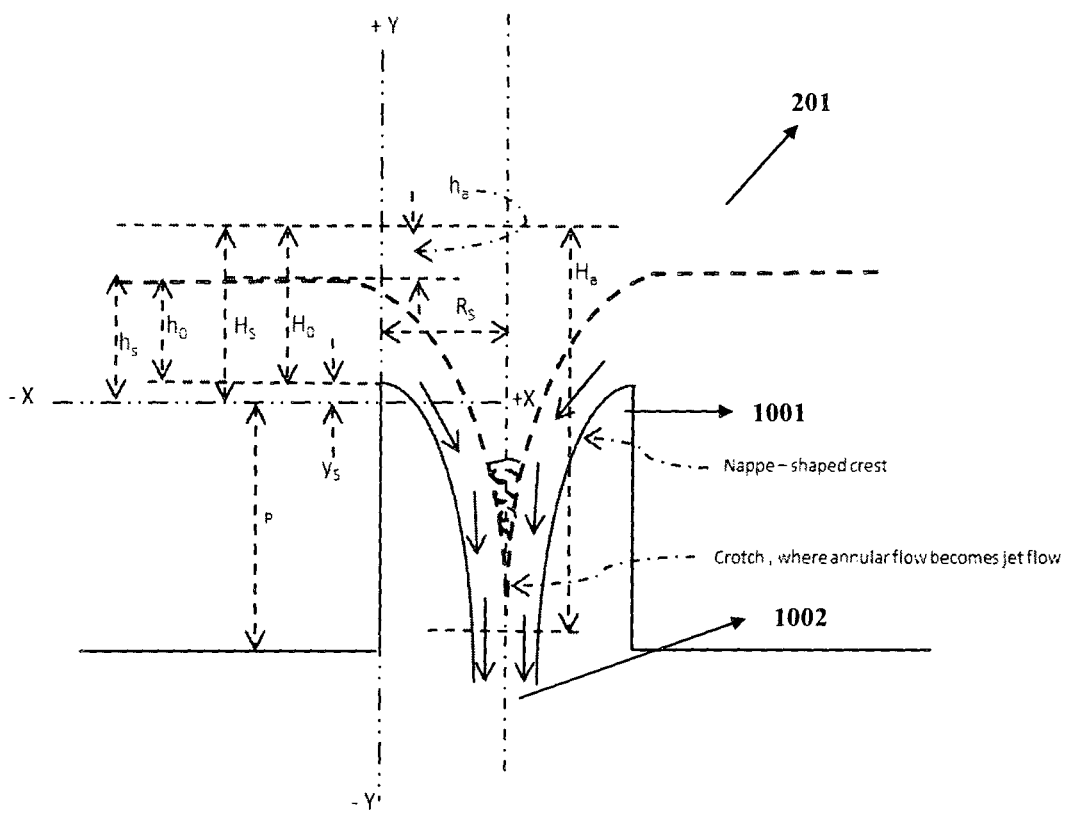
FIG. 10 illustrates elements of nappe-shaped profile of the drop inlet spillway.

Typical discharge characteristic of drop inlet spillway are shown in FIG. 6 the discharge curve shows that crest control shown in FIG. 7 will prevail for heads between the ordinates of a and g; orifice and tube control shown in 8 will govern for heads between the ordinates of g and h; and spillway conduit will flow full for heads above the ordinate of h shown in FIG. 9

The flow characteristic of a drop inlet spillway varies according to the proportional size of the different elements. Changing the diameter of the crest will change the curve ab on FIG. 6 so that the ordinate of g on curve cd will either higher or lower. For a larger diameter crest, greater outflows can be discharged over the weir at lower heads, the transition will fill up, and tube control will occur with a lesser heads on the crest. Similarly, by altering the size of the throat of the tube, the position of curve cd will change, indicating the heads above which tube control will prevail. If the transition is made of such size that curve cd is moved to coincide with or to the right of point j, the control will shift directly from the crest to the downstream end of the conduit.

For small heads, flow over the drop inlet spillway is governed by the characteristics of crest discharge. The vertical transition beyond the crest will flow partly full and the flow will cling to the sides of the shaft. As the discharge over the crest increases, the overflowing annular nappe will become thicker and, eventually, the nappe flow will converge into a solid vertical jet as show in FIG. 10. The point where the annular nappe joins the solid jet is called the crotch. After the solid jet forms, a boil will occupy the region above the crotch; both the crotch and the top of the boil become progressively higher with large discharges. For high heads the crotch and boil may almost flood out, showing only a slight depression and eddy at the surface.

Until the nappe converges to form a solid jet, free-discharging weir flow prevails. After the crotch and boil form, submergence begins to affect the weir flow and, ultimately, the crest will drown out. Flow is then governed either by the contracted jet formed by the overflow entrance, or by the shape and size of the vertical transition if it does not conform to the jet shape.

The discharge for flow over the crest and through the transition can be expressed as $$Q = CLH^{3/2} \quad (3)$$

Where Q is discharge of spillway, L is length of spillway, H is head over the crest and C is discharge coefficient. C will change with different definition of L and H.

If L is taken at the outside periphery of the overflow crest and if the head is measured to the apex of the over flow shape, the discharge for circular weir equation 3 can be written:

$$Q = C_0 (2\pi R_S) H_0^{3/2} \quad (4)$$

Where Q is discharge of circular weir, $R_S$ is radius of the circular weir, $H_0$ is head over the crest and $C_0$ is discharge coefficient of circular weir.

The discharge coefficient for a circular crest differs from that for a straight crest since the effects of submergence and back pressure incident to the joining of the converging flows. Thus, $C_0$ must be related to both $H_0$ and $R_S$, and can be expressed in terms of $H_0/R_S$.

When the crest outline and transition shape conform to the profile of the nappe shape for an $H_0$ head over the crest, free flow prevails for $H_0/R_S$ up to approximately 0.45 and weir control governs. As $H_0/R_S$ increases above 0.45, the weir partly submerges, and flow showing characteristics of submerged weir is the controlling condition. When $H_0/R_S$ ratio approaches 1.0, the water surface above the weir is completely submerged. For this and higher stages of $H_0/R_S$, the flow phenomenon is that of orifice.

Rapidly Varied Flow

In rapidly varied flow, the momentum equation used for calculating depth $Y_2$ and energy loss is written as follows:

$$\text{Depth } Y_2 = Y_1/2[\sqrt{(1+8F_1^2)} - 1] \quad (5)$$

$$\text{Energy loss } \Delta E = (Y_2 - Y_1)^3 / 4Y_2 Y_1 \quad (6)$$

Consider that the depth of the channel varies from supercritical state to subcritical state, then $Y_1$ is initial depth supercritical state and $Y_2$ is final depth of subcritical state. $F_1$ is Froude number of initial depth $Y_1$.

Equations 2, 5 and 6 may be used to calculate the flow velocities and depth along a channel with gradually varied flow, rapidly varied flow and energy loss of rapidly varied flow respectively.

Total Energy of Rapidly Varied Flow

For supercritical flow in a horizontal bed section and adverse slope section, the energy of flow is dissipated through frictional resistance along the channel resulting in decrease in velocity and increase in depth in the direction of flow and turns to subcritical flow. The subcritical depth is calculated using below equation:

$$Y_2/Y_1 = \tfrac{1}{2}[\sqrt{(1+8F_1^2)} - 1] \quad (7)$$

Similar to horizontal bed, weight of water in slops needs to be considered.

In horizontal bed sections, the effect of weight of water is negligible. Thus, the momentum formulae for finding subcritical depth on horizontal floor cannot be applied to find subcritical depth on sloping floor. The momentum principle can be used to derive an equation analogous to equation 5, and subcritical depth ratio in slope areas are written as follows:

$$\frac{Y_S}{Y_2} = [1.0071 e^{3.2386 \tan\theta}] \quad (8)$$

Where $Y_2$ is subcritical depth corresponding to $Y_1$ in a horizontal floor, $Y_s$ is subcritical depth on sloping floor and tan θ is the bed slope of the sloping floor channel.

Once the subcritical depth $Y_s$ on sloping floor for rapidly varied flow are calculated by momentum principle, the total specific energy of the rapidly varied flow after loss can be calculated by equation 2 and can be rewritten as follows:

$$E = Y_s + V^2/2g \quad (9)$$

Consider the example of a trapezoidal channel of width of about 14 m, bed slope of 1:10000, Manning's N is 0.018, side slope of 2.1:1, discharge rate of 300 m³/s designed according to one embodiment of present invention. The normal depth of channel is 7 m and velocity of 1.478 m/s. The system according to the invention can be used in any subcritical channels by modifying suitably based on the specific channel parameters.

The power channel according to above example comprises an Intake section which comprises of Inlet spillway 201, a first slope section 202, first power section 203, a second slope section 204 and second power section 205. The intake section which is the diversion of the existing channel for a length of 100 m and width of 25 m and it is an approach channel for power channel. The slope section 202 of the power channel is rectangle section of 60 m length and 8 m width, having supercritical inclination at angle 3.33 degrees, the angle of inclination is starts from the bed level of the existing channel so with this slope the bed elevation of the power channel goes below the bed elevation of the existing channel by 3.5 m. In this slope section, the subcritical flow of water entered through spillway is accelerated to supercritical state and thereby enhancing the velocity of the flow.

The first power section 203 of the power channel comprises of 3 subsection of horizontal bed subsection 203A, adverse slope subsection 203B and Slope subsection 203C and all the subsection are rectangle shape with bed width of 8 m and length 300 m, 200 m and 125 respectively.

The second slope section 204 and second power section 205 channel parameters are same as first slope section and power section. However, the horizontal channel transition in adverse slope subsection 205B from 8 m to 9 m and the bed width of the slope subsection 205C of second power section is 9 m.

The channel at second slope section recovers the depth required for the existing channel. Consequently the energy at recovery section is balanced with in the second slope section and flow archives study state. The depth recovered by recovery section is redirected back to existing channel without hampering the purpose of the system. Once the flow in the power channel is steady state, then the velocity all along the power channel is in the range of 3.0 to 6.5 m/s at different section. The parameters in the power channel are suitable for power extraction by installing an array of hydrokinetic turbine throughout the stretch of power channel.

The power channel design parameters are summarized in the table below.

TABLE 1

PROPOSED POWER CHANNEL DESIGN PARAMETERS
The parameters of the example trapezoid channel Bed width B = 14 m, Discharge Q = 300 m³/s, N = 0.018, velocity V = 1.478 m/s., Normal depth Y = 7 m, Bed slope = 1:10000 and side slope z = 2.1:1
The hydraulic parameters of power channel

| No. | Name of the section and subsection | Length in meter | Bed width in meter | slope in Degree | Side slope in meter |
|---|---|---|---|---|---|
| 1 | Intake section 201 | 100 | 25 | 0.057 | 0 |
| 2 | Drop inlet spillway | 15 | — | — | — |
| 3 | First slope section 202 | 60 | 8 | 3.33 | 0 |
| 4 | First Horizontal bed subsection 203A | 300 | 8 | 0 | 0 |
| 5 | First Adverse slope subsection 203B | 200 | 8 | Adverse 1.9 | 0 |
| 6 | First Slope subsection 203C | 125 | 8 | 0.229 | 0 |
| 7 | Second slope section 204 | 60 | 8 | 3.33 | 0 |
| 8 | Second Horizontal bed subsection 205A | 300 | 8 | 0 | 0 |
| 9 | Second Adverse slope subsection 205B | 200 | 8 to 9 | Adverse 1.9 | 0 |
| 10 | Second Slope subsection 205C | 260 | 9 | 0.11 | 0 |

The construction details of an exemplary embodiment of power channel design according to the present invention is shown in FIG. 2 and tabulated in Table 1. The expected initial and steady condition of water surface profile in each section and other hydraulic parameters of power channel are described in detail.

The power channel as illustrated in FIG. 2, the flow direction is from left to right. The flow direction is indicated by arrows. The flow begins at intake section 201 and concludes at the opposite exit end i.e. at power and recovery section 205. With reference to the cross section view of FIG. 2, there are a number of angled bottom floor structures that together with intake spillway make up the power channel system or design.

Intake section 201 of power channel begins with diversion of water from existing subcritical channel with the same slope of existing subcritical channel. The intake channel comprises of drop inlet spillway which is circular weir that will operate under a maximum head over the crest $H_0=2$ m and the channel parameters of intake section 201 are shown in the first row of table 1.

In exemplary embodiments of the present invention the following illustrates the procedure for designing a drop inlet spillway for discharging 300 m³/s of water from subcritical channel to power channel.

Assume P/R=0.3, where P is the approach depth of the spillway.

$R_s$ is determined by a trial and error procedure of assuming values of $R_s$ and computing the discharge.

Assume $R_s=8$ m; Then $H_0/R_s=2/8=0.25$.

From the above, it is observed that the $H_0/R_s<0.45$, so that free flow prevails and weir control governs.

The approach depth $P=R_s\times0.3=8\times0.3=2.4$ m.

For $H_0/R_s=0.25$ and $P/R_s=0.3$, from the plot of circular crest coefficient $C_0$ v/s $H_0/R_s$ for different approach depth. The $C_0$ could be found and $C_0=2.11$.

The discharge of the drop inlet spillway is calculated by equation (4).

$$Q=C_0(2\pi R_s)H_0^{3/2}$$

$$Q=2.11\times2\times3.142\times8\times2^{1.5}$$

$$Q=300.02 \text{ m}^3/\text{s}$$

The design shows that the intake spillway with circular crest radius 8 m and 2 m head above the crest is sufficient to discharge 300 m³/s water from subcritical channel to power channel.

In the Intake section the crest of the spillway is fixed 5 m above the bed of the subcritical channel so that the existing depth of the subcritical channel is maintained without hampering the upstream of the existing subcritical channel. The intake spillway connects the slope section of the power channel.

The first slope section 202 is the slope channel starts from the spillway of the intake section 201 and runs up to 60 m downstream. The channel parameters of slope section 202 are shown in the third row of table 1. The slope section 202 having supercritical slope accelerate flow received from the spillway, the velocity in this section rapidly increases and obtains higher velocity around 16.975 m/s at the end of the slope section 202 further the angle of inclination in slope section 202 lowers the bed elevation of power channel by 3.5 m than existing subcritical channel.

The initial status of first slope section 202 is tabulated in table 2 below

TABLE 2

INITIAL STAUTS OF SLOPE SECTION 202

| Depth $Y_1$ | Velocity $V_1$ | $V_1^2/2\,g$ | Froude number |
|---|---|---|---|
| 2.2 | 16.975 | 14.69 | 3.65 |

The Horizontal bed subsection 203A of the first power section 203 of the power channel receives supercritical flow from slope section 202 and having same bed width same as width of slope section. The channel parameters of this subsection are tabulated in fourth row of the table 1. The channel section 203A having horizontal bed, initially the higher velocity flow from slope section 202 will pass through this section and velocity of the flow is dissipated through frictional resistance along the channel there by gradually reducing the velocities and increasing the depth of the flow.

The flow status of horizontal bed subsection of power channel in the stretch of 300 m before steady state is tabulated in table 3 below.

TABLE 3

FLOW STAUTS OF THE SUBSECTION 203A BEFORE STEADY STATE

| Distance from the first slope section 202 | Depth $Y_1$ in m | Velocity $V_1$ in m | $V_1^2/2\,g$ | Froude number | Specific Energy (C2 + C4) |
|---|---|---|---|---|---|
| 0 | 2.2 | 16.98 | 14.68 | 3.65 | 16.88 |
| 62 | 2.51 | 14.93 | 11.36 | 3.00 | 13.87 |
| 120 | 2.81 | 13.33 | 9.05 | 2.53 | 11.86 |
| 174 | 3.1 | 12.03 | 7.38 | 2.18 | 10.48 |
| 222 | 3.4 | 10.97 | 6.13 | 1.89 | 9.53 |
| 265 | 3.7 | 10.08 | 5.17 | 1.67 | 8.87 |
| 300 | 4.0 | 9.32 | 4.42 | 1.48 | 8.42 |

Adverse slope subsection 203B and slope subsection 203C of the first power section 203 of the power channel is the flow depth recovering section, the flow from horizontal bed 203A entering to this section and passed on to the slope subsection 203C. The channel parameters of this channel section are tabulated in fifth row and sixth row of the table 1 respectively. The adverse slope 203B section is having inverse inclination of angle 1.9 degree so that the bed elevation of power channel become higher than bed elevation of existing subcritical channel by 0.5 m. The higher velocity flow from horizontal bed 203A is passed through into this section and the flow gradually dissipates through adverse slope by recovering depth and finally passed in to slope subsection 203C. This section finally confirms the final depth i.e. calculated as 5.96 m and the first power section 203 and first slope section 202 become steady state by balancing energy of power section 203 at slope section 202 of the power channel.

The total energy at subsections of first power section 203 and first slope section 202 are calculated below and the steady state flow status of horizontal bed subsection 203A due to adverse slope subsection 203B and slope subsection 203C is tabulated in Table 4.

Energy Calculation at first slope section 202 and first power section 203 is explained in detail below:

The supercritical flow from first slope section 202 turns to subcritical flow due to horizontal 203A and adverse slope subsection 203B and subcritical depth is calculated by using equation 7 and 8 on horizontal floor and sloping floor respectively by considering the parameters tabulated in Table 2.

The equation for sequent depth on horizontal floor is
$Y_2/Y_1 = \frac{1}{2}[\sqrt{(1+8F_1^2)}-1]$
Than $Y_2 = Y_1 * \frac{1}{2}[\sqrt{(1+8F_1^2)}-1]$
In is clear from table 2 that $Y_1=2.2$ m, $v_1=16.975$ m/s, $F_1$ calculated by equation $F_1 = v_1/\sqrt{g \cdot Y_1} = 3.65$
So $Y_2 = 10.3$ m.
The equation for sequent depth on slop floor is $$\frac{Y_S}{Y_2} = [1.0071 e^{3.2386 \tan\theta}], \text{ Here } \theta = 3.33$$

$$Y_s = Y_2 \times 1.0071 \times e^{(3.2386 \times \tan\ 3.33)}$$

$$Y_s = Y_2 \times 1.0071 \times 1.216 = 12.61 \text{ m}$$

The calculated flow condition and the energy at steady state in slope subsection 203C of first power section are tabulated in Table 4.

TABLE 4

FLOW STAUTS OF THE SLOPE SUBSECTION 203C AT STEADY STATE

| Depth Y in m | Velocity V in m/s | $V^2/2\,g$ | Froude number | Specific Energy (C1 + C3) |
|---|---|---|---|---|
| 5.96 | 6.28 | 2 | 0.82 | 7.96 |

Based on the above flow condition at the slope subsection 203C the flow condition of horizontal bed 203A are calculated based on the adverse slope inclination and flow condition of slope subsection 203C and tabulated in table 5.

TABLE 5

FLOW STAUTS OF THE HORIZONTAL BED 203A AT STEADY STATE

| Depth Y in m | Velocity V in m/s | $V^2/2\,g$ | Froude number | Specific Energy (C1 + C3) |
|---|---|---|---|---|
| 9.96 | 3.76 | 0.72 | 0.38 | 10.68 |

From the above result it is clear that at steady state the energy at first slope section 202 is higher than the energy at first power section 203 (12.61>10.68) so the energy of first power section 203 is balanced in the first slope section 202 and flow become steady state.

The information available in table 4 and 5 indicates that the velocities are in the range of 3.76 to 6.28 m/s which is suitable for power extraction from hydrokinetic turbines.

At the second slope section 204 and horizontal bed subsection 205A, the flow profile and calculation of flow condition before steady state are similar and the results are also same as that of first slope section 202 and horizontal bed subsection 203A. The width, length and angle of inclination of first and second slope also horizontal bed of first and second power section are maintained same and are tabulated in Table 1.

At the adverse slope subsection 205B and slope subsection 205C of second power section, the method and flow profiles are similar to first power section 203. However, the adverse slope 205B having horizontal transition and changes the width of the channel wider gradually. The slope subsection 205C is wider than the width of the first power section due to recover the depth of the existing subcritical back in this section and finally bed of the power channel joins the existing subcritical bed slope and envisages the smooth flow of the subcritical channel. The channel parameters of the 205B and 205C are tabulated in ninth and tenth row of Table 1.

The energy calculation at second slope section 204 and second power section 205 is explained below.

The energy calculation and results of the first slope section 202 are holds good for second slope section 204 and energy of second slope section is equal to 12.61.

The calculated flow condition and the energy at steady state in slope subsection 205C of second power section are tabulated in Table 6.

TABLE 6

FLOW STAUTS OF THE SLOPE SUBSECTION 205C AT STEADY STATE

| Depth Y in m | Velocity V in m/s | $V^2/2g$ | Froude number | Specific Energy (C1 + C3) |
|---|---|---|---|---|
| 7.0 | 4.76 | 1.15 | 0.57 | 8.15 |

Based on the above flow condition at slope subsection 205C the flow condition of horizontal bed 205A is calculated. Likewise, based on the adverse slope inclination and flow condition of slope subsection 205C, the specific energy is calculated and tabulated in Table 7.

TABLE 7

FLOW STAUTS OF THE HORIZONTAL BED 205A AT STEADY STATE

| Depth Y in m | Velocity V in m/s | $V^2/2g$ | Froude number | Specific Energy (C1 + C3) |
|---|---|---|---|---|
| 11 | 3.4 | 0.59 | 0.32 | 11.59 |

From the above result it is clear that at steady state the energy at second slope section 204 is higher than the energy at second power section 205 (12.61>11.59) so the energy of second power section 205 is also balanced in the second slope section 204 and flow become steady state.

Table 6 and 7 indicates that the velocities are in the range of 3.4 to 4.76 m/s which is suitable for power extraction from hydrokinetic turbines.

At steady state the power channel depth and velocities at each section are calculated and tabulated in table 8.

TABLE 8

FLOW STAUTS OF POWER CHANNEL AT STEADY STATE

| Power channel parameters | First slope section 202 | First power section 203 | | | Second slope section 204 | Second power section 205 | | |
|---|---|---|---|---|---|---|---|---|
| | | 203A | 203B | 203C | | 205A | 205B | 205C |
| Length of section in m | 60 | 300 | 200 | 125 | 60 | 300 | 200 | 260 |
| Avg. depth in m | 8.21 | 9.96 | 7.96 | 5.96 | 9.25 | 11 | 9 | 7 |
| Avg. Velocity in m/s | 4.56 | 3.76 | 4.71 | 6.28 | 4.05 | 3.4 | 4.16 | 4.76 |

The dimensions of channel according to the present invention, and other important dimensions are set forth in the tables 1 as was noted previously, and as demonstrated, the various dimensions and sizes of channel varies based on the channel parameters and requirement of power generation. Likewise, it should be understood that the dimensions of the present invention can be varied to fit particular site condition (for example, channel width, cross section, flow depth, and ambient flow velocity, as well as other such factors).

Concept of Power Generation in Mild Slope Channel

FIGS. 1A and 1B illustrate the complete system of subcritical channel hydrokinetic power generation according to one embodiment of present invention. Once the desired velocity is achieved in power channel the power generation is achieved by an array of hydrokinetic turbines all along the power channel.

In hydrokinetic power generation scheme the power is determined from the following equation:

$$P = \frac{1}{2} \times \rho \times A \times V^3 \times \eta \text{ Watts}$$

P=power in Watts, ρ=Density of water, A=Swept area in m², V=velocity in m/s and η=system efficiency.

The range of power that might be generated at one location of the power channel using the present invention can be in the range of about 100 KW to about 2 MW.

The total power extraction in the power channel of different section are calculated and tabulated in table 9.

TABLE 9

POWER GENERATION IN THE POWER CHANNEL AT STEADY STATE

| Power channel parameters | First slope section 202 | First power section 203 | | | Second slope section 204 | Second power section 205 | | | Total power in KW |
|---|---|---|---|---|---|---|---|---|---|
| | | 203A | 203B | 203C | | 205A | 205B | 205C | |
| Avg. depth in m | 8.21 | 9.96 | 7.96 | 5.96 | 9.25 | 11 | 9 | 7 | |
| Avg. Velocity in m/s | 4.56 | 3.76 | 4.71 | 6.28 | 4.05 | 3.4 | 4.16 | 4.76 | |
| Power generation in each section with 42% turbine efficiency | | | | | | | | | |
| Turbine rotor depth in m | 7 | 9 | 7 | 5 | 8 | 10 | 8 | 6 | |
| Turbine Rotor Dia. in m | 7 | 7 | 7 | 7 | 7 | 7 | 7 | 7 | |
| Swept area in sq. m | 49 | 63 | 49 | 35 | 56 | 70 | 56 | 42 | |
| Power in KW | 950 | 700 | 1000 | 1800 | 750 | 550 | 800 | 950 | 7500 |

Table 9 depicts that the possibility of power generation for the exemplary embodiments of present invention for the specific problem considered and the results show that it is possible to achieve about 7500 KW or 7.5 MW.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system for generating hydrokinetic power from a subcritical channel comprises:
   a power channel diverted from the subcritical channel for generating hydrokinetic power by changing one more flow parameters of water, wherein the power channel includes an intake section, one or more slope section, one or more power section and a recovery section, wherein the power channel is an open channel;
   an intake spillway at the intake section of power channel, connecting the subcritical channel with the power channel for enhancing the velocity of water, wherein the intake spillway is designed based on rate of discharge of water to be drawn from the subcritical channel; and
   an array of turbines located in the power channel for generating power using the diverted water from the subcritical channel, wherein the number of turbines are based on the length of the power channel.

2. The system as claimed in claim 1, wherein effect due to change in flow parameters of water at the power channel is isolated from the subcritical channel by maintaining a free flow operation of the intake spillway and a pre-defined energy at the slope section and the recovery section of the power channel.

3. The system as claimed in claim 1, wherein the power channel has at least one of a trapezoidal, rectangular, circular, elongated circular and U shaped channel with a pre-defined cross sectional area.

4. The system as claimed in claim 1, wherein the inlet spillway has at least one of a rectangular, drop inlet, trapezoidal triangular, and labyrinth.

5. The system as claimed in claim 1, wherein the slope section of the power channel has at least one of a supercritical slope, critical slope or steeper mild slope with a pre-defined bottom elevation.

6. The system as claimed in claim 1 further comprises:
   a first diversion weir installed across subcritical channel beyond opening of the power channel for diverting the flow of water to the power channel, where the first diversion weir is closed for diverting the water to generate power in the power channel; and
   a second diversion weir located at the opening of power channel for closing the power channel during no power generation in the power channel.

7. The system as claimed in claim 1, wherein the intake spillway comprises a crest of pre-defined length.

8. The system as claimed in claim 1, wherein depth above a crest of the inlet spillway is maintained at a predetermined height for discharging the flow into the slope section of the power channel; and
   elevation of the inlet spillway crest is fixed based on the quantity of water and crest length of the inlet spillway, where the elevation of depth above the crest of the inlet spillway maintains the elevation of depth above the bottom of the existing subcritical channel.

9. The system as claimed in claim 1, wherein the power section comprises at least one of a horizontal bed, an adverse slope subsection, vertical subsection and a slope subsection,
   wherein the horizontal bed and each subsection having a pre-defined cross sectional area;
   the adverse slope subsection having a gradually increasing bottom elevation up to a predetermined height;
   the vertical subsection having a sudden increasing bottom elevation up to a predetermined height; and
   the slope subsection, having at least one of a supercritical slope, subcritical slope and critical slope with a predetermined length.

10. The system as claimed in claim 5, wherein one or more turbines are fixed at the slop section for generating power.

11. The system as claimed in claim 1, wherein cross sectional area of one or more sections in the power channel corresponding to the water discharge from the intake spillway and velocity requirement at each of the sections.

12. The system as claimed in claim 5, wherein the recovery section is connected to the power section having a pre-defined width at the end of power section up to a predetermined length with the slope, where the recovery section connects the power channel with the subcritical channel.

13. The system as claimed in claim 3, wherein elevation of bed of the recovery section is designed to match the bottom elevation of the subcritical channel.

14. The system as claimed in claimed 1, wherein each of the turbines in the array of turbines are located at a pre-defined distance from each other in the power channel based on the velocity recovery length and turbulence of water in the power channel.

15. The system as claimed in claim 1, wherein the velocity of water is enhanced based on at least one of a length of power channel, bed slop of each section of the power channel, area of cross section of power channel, shape of power channel, depth of power channel and rate of discharge of power channel.

16. The system as claimed in claim 1, wherein the power generated by the system corresponds to the swept area and velocity of water in the power channel.

* * * * *